United States Patent
Hu et al.

(10) Patent No.: US 9,467,667 B2
(45) Date of Patent: Oct. 11, 2016

(54) METHOD AND APPARATUS OF WHITE BALANCE ADJUSTMENT

(75) Inventors: Fei Hu, Shenzhen (CN); Yi Li, Pleasanton, CA (US); Liangliang Cao, Shenzhen (CN)

(73) Assignee: APPOTROINCS CORPORATION LIMITED, Shenzhen (CN)

( * ) Notice: Subject to any disclaimer, the term of this patent is extended or adjusted under 35 U.S.C. 154(b) by 902 days.

(21) Appl. No.: 13/606,629

(22) Filed: Sep. 7, 2012

(65) Prior Publication Data

US 2013/0063704 A1    Mar. 14, 2013

Related U.S. Application Data

(60) Provisional application No. 61/532,726, filed on Sep. 9, 2011.

(51) Int. Cl.
- *G03B 21/20* (2006.01)
- *H04N 9/31* (2006.01)
- *G03B 33/08* (2006.01)
- *H04N 9/73* (2006.01)

(52) U.S. Cl.
CPC ........... *H04N 9/3111* (2013.01); *G03B 21/204* (2013.01); *G03B 21/206* (2013.01); *G03B 33/08* (2013.01); *H04N 9/3155* (2013.01); *H04N 9/3158* (2013.01); *H04N 9/3194* (2013.01); *H04N 9/73* (2013.01)

(58) Field of Classification Search
CPC ...... G03B 21/204; F21S 10/007; H04N 9/73
USPC .......................................................... 353/84
See application file for complete search history.

(56) References Cited

U.S. PATENT DOCUMENTS

2005/0073845 A1*   4/2005   Matsui .................. 362/293

\* cited by examiner

*Primary Examiner* — Sultan Chowdhury
*Assistant Examiner* — Danell L Owens
(74) *Attorney, Agent, or Firm* — Chen Yoshimura LLP

(57) ABSTRACT

A white balance adjustment method and apparatus for a single DLP projector system is disclosed. The projection system includes a solid state light source device, a sync signal generator, and a controller. The light source device generates an output which is a repeating color sequence of at least two primary color lights. The sync signal generator generates a synchronization signal representing a timing of the color sequence of the output light. The controller calculates drive current values corresponding to each of the two primary colors based on a target white balance and measured color properties of the output light, and supplies a modulated drive current to the light source device. The modulated drive current is synchronized to the sync signal and has the calculated drive current values. As a result, a white light having the target white balance is output.

21 Claims, 9 Drawing Sheets

METHOD AND APPARATUS OF WHITE BALANCE ADJUSTMENT

This application claims priority under 35 USC §119(e) from U.S. Provisional Patent Application No. 61/532,726, filed Sep. 9, 2011, which is herein incorporated by reference in its entirety.

BACKGROUND OF THE INVENTION

1. Field of the Invention

The present invention relates to a white balance adjustment method for a light source. More particularly, the present invention relates to a white balance adjustment method and apparatus for adjusting the white balance of a light source used in a projection display system that employs a single spatial light modulator (SLM), such as digital light processor (DLP).

2. Description of the Related Art

In conventional applications that require high luminance light sources, such as projection display systems or stage lighting, gas discharge lamps are usually used. However, gas discharge lamps suffer from short lifetimes and cause environmental pollution.

A more environmentally-friendly choice for this type of light source is solid state light (SSL) sources based on laser diodes (LDs) or light emitting diodes (LEDs). Currently, there are two types of SSL sources that can be used in projection displays. The first is the direct light emitting devices. Another is a hybrid approach, which uses a blue or ultraviolet (UV) light emitting device to excite a wavelength conversion material such as phosphors. Both of these two types of light sources have long lifetime, better energy efficiency and less environmental pollution. As a result, SSL sources are good candidates for the next generation high luminance light sources that can replace conventional gas discharge lamps.

In replacing gas discharge lamps by SSL sources, it may be desirable to keep many components of the current projection systems unchanged, so that many existing equipment, products and designs can be adapted for use with SSL sources, which is both environment friendly and helps the projection display business adopt this new light source technology more quickly. However, this may lead to a problem of color balance. As seen in FIG. 1, a hybrid SSL source has a different spectrum than an ultra high performance (UHP) lamp. If a SSL source replaces a UHP lamp in a projector, the output red, green and blue colors may be only slightly different than those provided by the UHP lamp, but the luminous flux proportion of the red, green and blue colors may be very different from that of the traditional projector using UHP lamp, which will result in very different white color balance.

In more detail, FIG. 2 is a schematic view of a conventional single DLP projection system. The UHP lamp 201 generates a white light which is collected by a reflector 202 and condensed by a lens 203. A rotating color wheel 204 has different filter segments that allow red (R), green (G) and blue (B) light to pass through. When the wheel rotates, different filter segments are sequentially located in the path of the white light from the lens 203 to output a predetermined repeating sequence of color lights. The different colored light sequentially arrives at a spatial light modulator 210 through a series of optics like integration rod 205, lenses 206, 207 and 208, and a TIR (total internal reflection) prism 209. The spatially modulated colored light is directed to a projection lens 211 and forms an image on a screen.

If the UHP lamp is replaced by a SSL source 301, as seen in FIG. 3, the white balance and luminance may change since the luminous flux ratio of the R, G and B light and the radiant flux of the SSL source may be different from those of the UHP lamp. White balance and luminance adjustment are desired for such a system.

Moreover, in current projection system using SSL sources, white balance and luminance may vary as a result of aging, temperature changes, and other factors. In addition, customers may desire a projection system that has tunable white balance and luminance according to their preferences or needs. Such systems also need adjustment of white balance and luminance.

SUMMARY OF THE INVENTION

The present invention provides a white balance and luminance adjustment method and apparatus that utilize a synchronization signal from the rotating color wheel to modulate the drive current of the SSL sources in single DLP projection systems.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a projection system which includes: a light source device for generating an output light which is a repeating color sequence of at least two primary color lights; a synchronization signal generator for generating a synchronization signal representing a timing of the color sequence of the output light; projecting optics for projecting the output light onto a screen; a detector for measuring color properties of the output light; and a controller for calculating drive current values corresponding to each of the at least two primary colors based on a target white balance and the measured color properties of the output light, and supplying a modulated drive current to the light source device, the modulated drive current being synchronized to the synchronization signal and having the calculated drive current values, wherein the output light of the light source has the target white balance.

In another aspect, the present invention provides a color adjustment method for a projection system, which includes: generating an output light by a light source device, the output light being a repeating color sequence of at least two primary color lights; generating a synchronization signal representing a timing of the color sequence of the output light; projecting the output light onto a screen; measuring optical properties of the output light; calculating drive current values corresponding to each of the at least two primary colors based on a target white balance and the measured optical properties; and supplying a modulated drive current to the light source device, the modulated drive current being synchronized to the synchronization signal and having the calculated drive current values, wherein the output light of the light source has the target white balance.

It is to be understood that both the foregoing general description and the following detailed description are exemplary and explanatory and are intended to provide further explanation of the invention as claimed.

DETAILED DESCRIPTION OF THE PREFERRED EMBODIMENTS

A projection display system is used as an example to explain embodiments of the present invention. However, the present invention applies to many other systems that require high luminance and time sequential colored light.

The present invention is directed to a white balance adjustment method and related apparatus in a single DLP projector system that uses a solid state light source. For conventional lamps, their light output levels cannot be conveniently modulated in the time domain. SSL sources, on the other hand, can be modulated in the time domain very easily. Various methods according to embodiments of the present invention provide the SSL source with different drive currents for each time period that corresponds to a certain colored light. Therefore the light output level for each primary color can be changed as desired, which can result in a desired white balance. The synchronization signal for changing the drive current of the SSL source can be taken from the rotating color wheel of the projector. In this way, the color wheel of the projector shown in FIG. 3 can remain the same, and the software that controls the DLP does not need to be changed.

Figure 1:
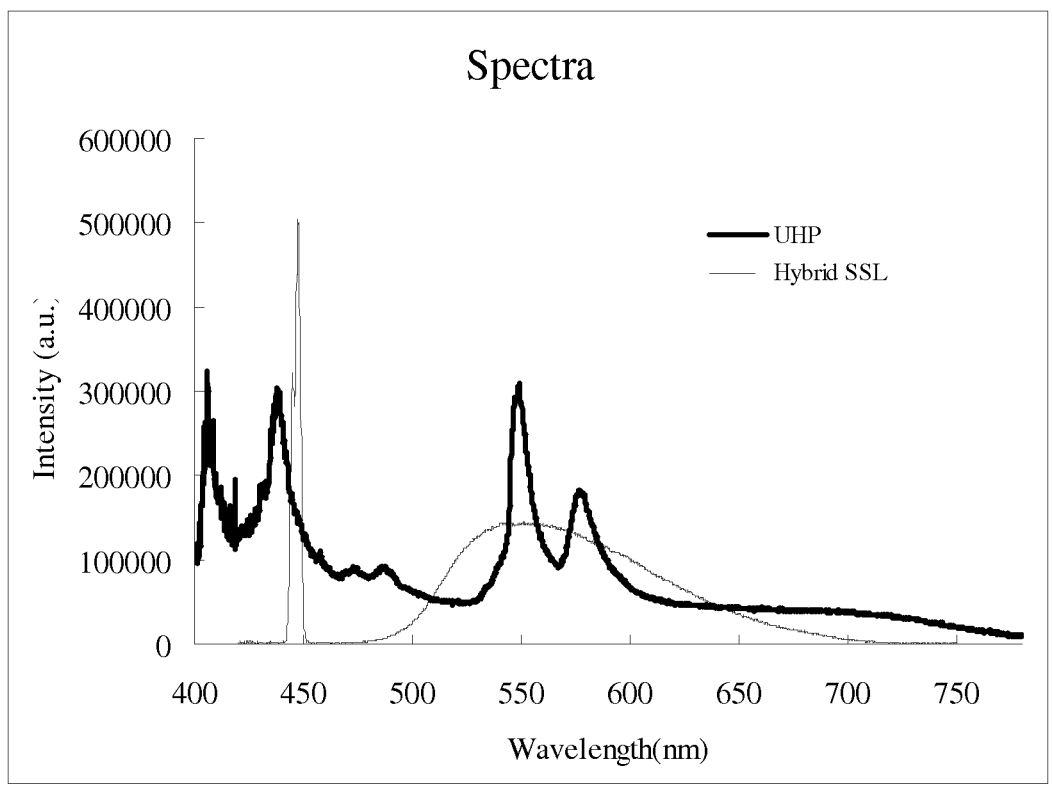
FIG. 1 show the spectra of an SSL source and a UHP lamp.
Figure 2:
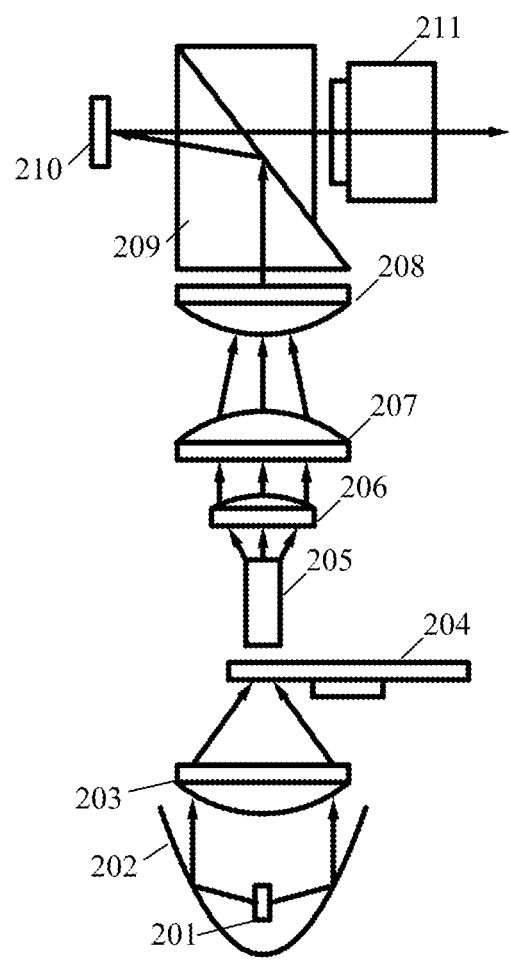
FIG. 2 is a schematic view of a conventional single DLP projection system with a UHP lamp.
Figure 3:
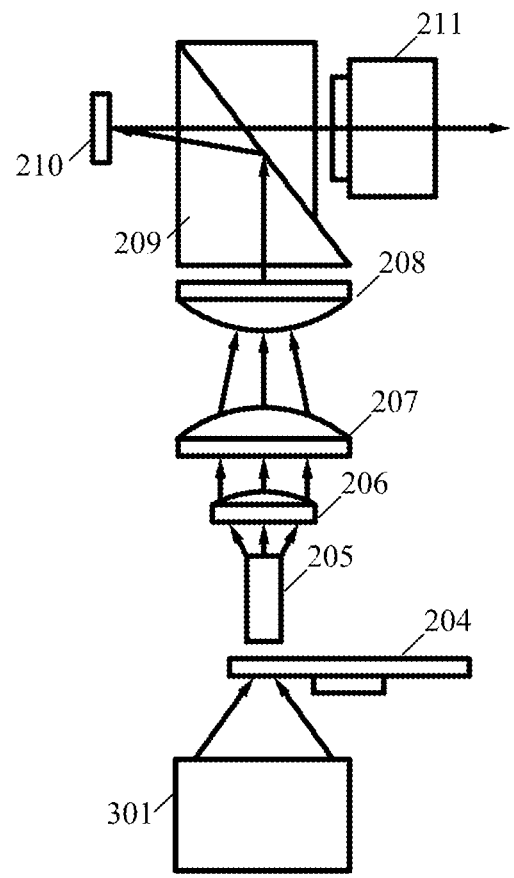
FIG. 3 is a schematic view of a single DLP projection system with an SSL sources.
Figure 4:
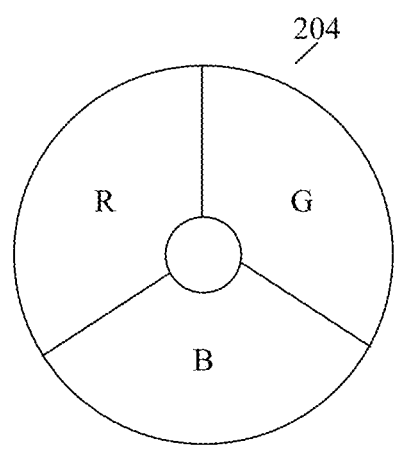
FIG. 4 shows an exemplary color wheel useful in the systems shown in FIG. 2 and FIG. 3.

FIG. 4 schematically shows the structure of a color wheel 204 used in the devices shown in FIG. 2 and FIG. 3. In this example, the color wheel is composed of three filter segments which transmit red, green and blue lights, respectively. When the wheel rotates, red, green and blue light are outputted sequentially from the white light generated by the source 201 or 301.

Figure 5:
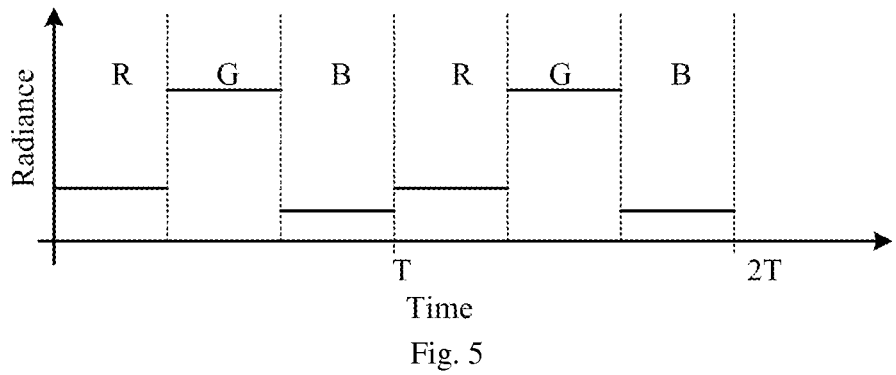
FIG. 5 is a diagram showing an exemplary output light sequence generated by the SSL source shown in FIG. 3.

When a white color is needed to be displayed on the screen, the output light on the screen is a repeating sequence of R, G and B light. As seen in the example shown in FIG. 5, the output light has a sequence shown over two periods of the wheel's rotation. Because the period of each color light is short, the light is integrated by the human eye and the viewer perceives a white color on the screen.

Figure 6:
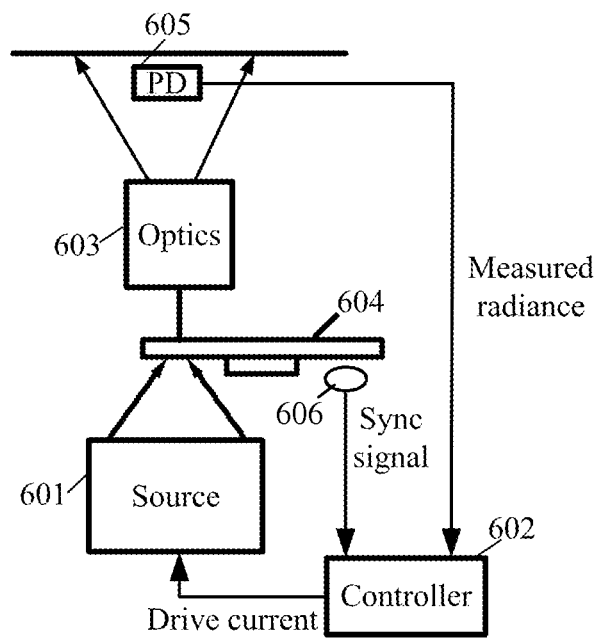
FIG. 6 is a block diagram of a white balance adjustment system according to one embodiment of the present invention.

FIG. 6 is a block diagram of a white balance adjustment system according to one embodiment of the present invention. The system includes an SSL source 601 which emits a white light under a drive current, a rotating color wheel 604 similar to the wheel 204 shown in FIGS. 2-4, optics 603 for projecting the light from the color wheel 604 onto a screen, a photodetector 605 for measuring the projected light, a controller 602 for controlling the drive current supplied to the light source 601 and perform other functions, and a sync signal generator 606 coupled to the color wheel 604 for generating a sync signal for the controller. When the color wheel 604 rotates, different filter segments are sequentially located in the path of the white light from the SSL source 601 to output a predetermined repeating sequence of color lights. The output light from the projection optics 603 is measured by the detector 605, which may be RGB photodetectors. The measured RGB radiance data and/or chromaticity information are transmitted to the controller 602. The controller 602 performs necessary calculation and comparison (described in more detail later) to obtain values of adjusted drive currents corresponding to one or more of the primary colors that will achieve a desired white balance.

Figure 7:
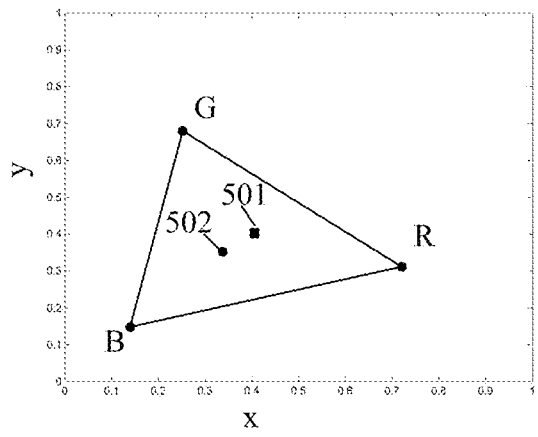
FIG. 7 shows an International Commission on Illumination (CIE) chromaticity diagram.

An example of white balance adjustment is described with reference to FIGS. 7, 8 and 9A-9D. FIG. 7 shows an International Commission on Illumination (CIE) chromaticity diagram. The desired white balance has chromaticity coordinates shown as point 502, while the white color measured by the photodetector 605 has different chromaticity coordinates shown as point 501. It can be seen that more blue light is needed to shift the point 501 closer to the desired white color point 502. The controller 602 calculates the color difference between color point 501 and color point 502, and calculates required changes in the drive current when the color wheel's various filters are under illumination of the light source.

Figure 8:
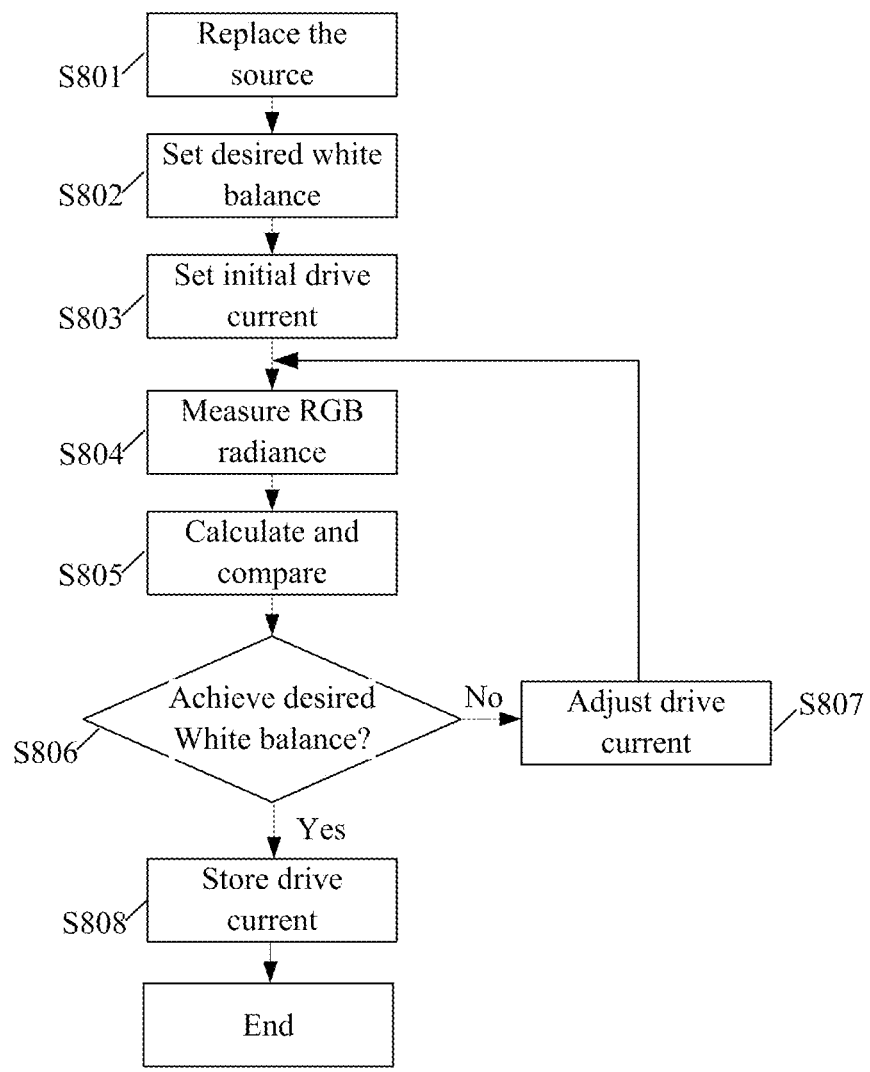
FIG. 8 is a flow chart showing a white balance adjustment method according to an embodiment of the present invention.

FIG. 8 is a flow chart illustrating a white balance adjustment method according to an embodiment of the present invention. In step S801, a white SSL is provided as the source of a projection system. The procedure sets a desired white balance (step S802) and initial drive current values corresponding to the three color periods of the rotation (step S803). In step S804, the output light is measured by the detector 605 as will be described in more detail later. In step S805, the current white balance status is calculated from the measured values and compared with the desired white balance. The white balance can be defined and calculated in a number of ways, as will be described in more detail later. Based on the comparison, it is determined whether the desired white balance is achieved or not (step S806). If the desired white balance is achieved ("Yes" in step S806), the procedure goes to step S808 to store the drive current values and ends; otherwise ("No" in step S806), the procedure goes to step S807 to adjust the drive current for one or more of the R, G and B time periods and then goes back to step S804, and the above steps are repeated.

Figure 9A:
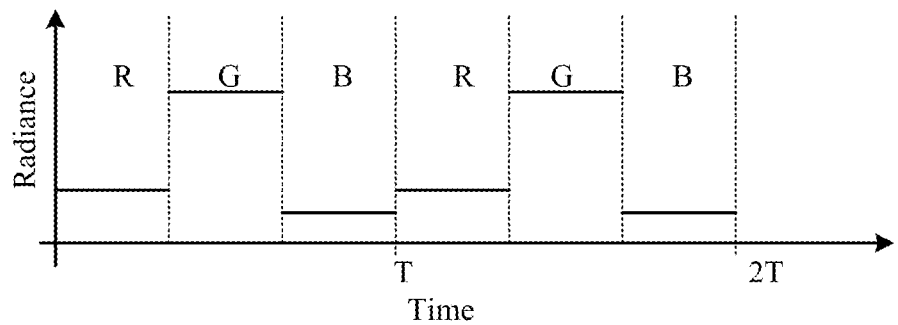
FIGS. 9A-9D illustrate an exemplary adjustment procedure, showing the primary color radiance and corresponding drive current before and after the adjustment.
Figure 9B:
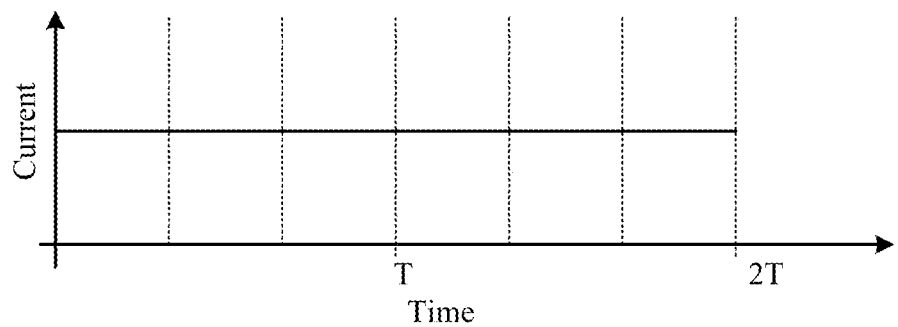
Figure 9C:
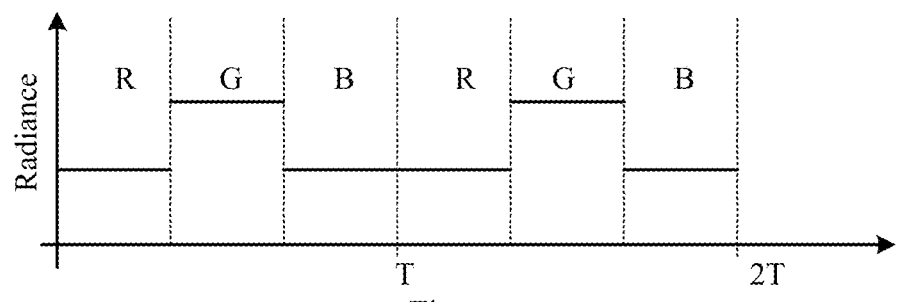
Figure 9D:
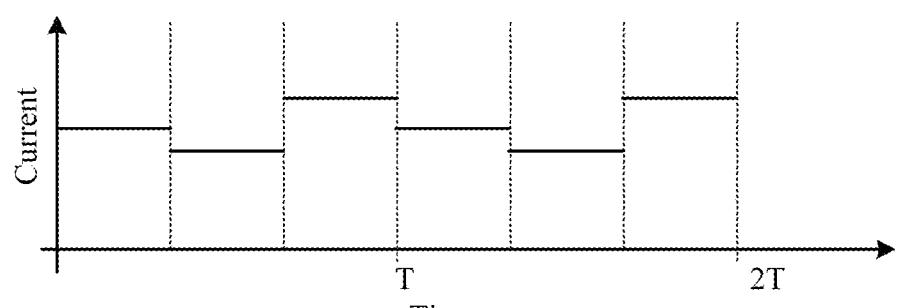

As an example, FIGS. 9A-9D show a simple adjustment procedure and result. The measured radiance of the output light of the SSL source 601 is as shown in FIG. 9A for the R, G and B periods, when the drive current of the source is a constant for all periods as shown in FIG. 9B. FIG. 9C shows the target radiance values for the R, G, B periods that will achieve the desired white balance. Based on the difference between the measured RGB radiance shown in FIG. 9A and the target RGB radiance values shown in FIG. 9C, the controller 602 will increase the drive current for the red and blue periods relative to the green period in this example. FIG. 9D shows the adjusted drive current that will achieve the target RGB radiance values shown in FIG. 9C. After such adjustment, the desired output light in FIG. 9C can be achieved when the controller provides the adjusted drive current shown in FIG. 9D to the SSL source 601, synchronized with the rotation of the color wheel 604. The drive current shown in FIG. 9D is referred to as modulated drive current because its level varies for different color periods.

The synchronization signal for synchronizing the modulated drive current with the rotation of the color wheel 604 is provided by the sync signal generator 606 which detects a position of the color wheel 604 as shown in FIG. 6. The detection may be done by optical, mechanical, electrical, or by other suitable means. The sync signal, which represents a timing of the color sequence of the light from the color wheel, may have various forms and the synchronization control method of the controller 602 can be designed accordingly. For example, the sync signal may be in the form of one signal per revolution of the color wheel to indicate the start of the red color light, and the controller divides the period between two sync signals into three equal periods for the R, G and B lights. Alternatively, the sync signal may indicate the start of each color light.

As mentioned earlier, white balance can be defined in a number of ways, and the measurement, comparison and calculation involved in white balance adjustment can be carried out in a number of ways.

Figure 12:
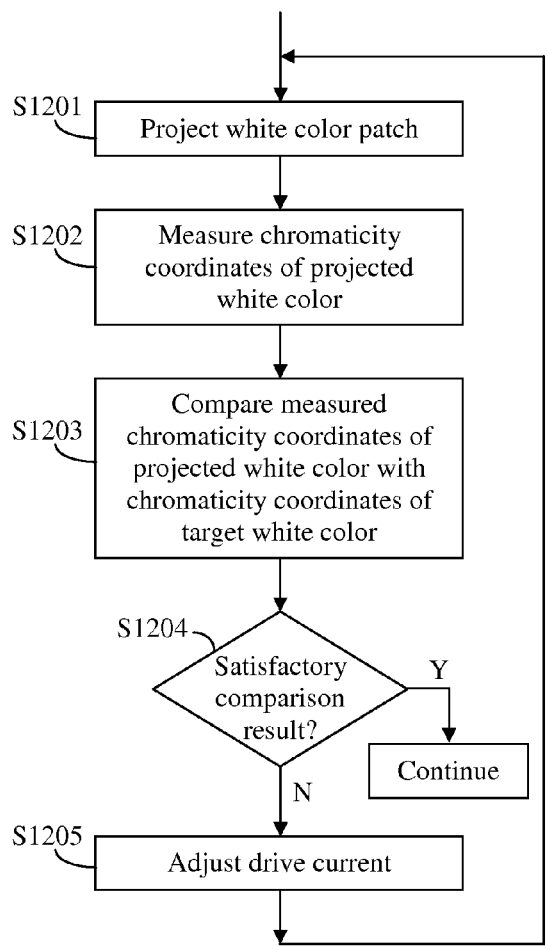
FIGS. 12 and 13 show two examples of white balance adjustment procedures.

In a first approach, shown in FIG. 12, a white color patch or image is projected on the screen (step S1201), and the detector 605 measures the chromaticity coordinates of the projected white color (step S1202). This approach requires the detector 605 to be one that can measure the chromaticity of a light (e.g., one that includes three detectors each covered by a primary color filer). It does not require a DLP in optics 603 because a white color can be projected on the screen by simple projection lenses, although a DLP can be used in the optics in which case it will project a white color patch on the screen for the purpose of measurement. Then, the measured chromaticity coordinates of the projected white color and the chromaticity coordinates of the target white color are compared (step S1203; refer to FIG. 7). If the chromaticity coordinates are not the same ("N" in step S1204), an adjustment of one or more of the drive current is estimated (e.g. empirically) (step S1205) and the adjusted drive current is applied to the SSL source 601 to generate a new white color (step S1201). The new white color produced by the adjusted drive current is measured again by the detector, and the process is repeated until the target white color is obtained on the screen ("Y" in step S1204). It can be seen that this iterative approach shown in FIG. 12 is a more detailed version of steps S804 to S807 shown in FIG. 8.

Figure 13:
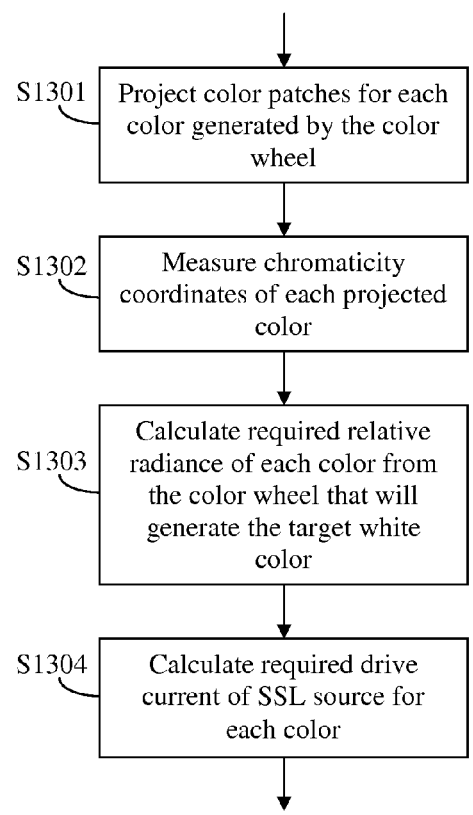

In a second approach, shown in FIG. 13, solid color patches of each of the multiple colors generated by the rotating color wheel 604 are projected on the screen (e.g. sequentially, each for a sufficient length of time) (step S1301), and the chromaticity coordinates of each color lights is measured (step S1302). Step S1301 requires a DLP in the optics 603 to project the color lights on the screen. The detector 605 used in step S1302 is one that can measure the chromaticity of a light. Then, based on the chromaticity coordinates of each of the multiple color lights, as well as the known chromaticity coordinates of the target white color, the controller 602 calculates the required relative radiance of each color from the color wheel that will generate the target white color (step S1303). Then, based on the relationships between drive current and radiance for each color light generated by the color wheel, the controller 602 calculates the required drive current for each color to be supplied to the SSL source (step S1304). Steps S1301 to S1305 may replace steps S804 to S807 in FIG. 8.

In the second approach, in order to precisely calculate the drive currents, prior knowledge of the relationship between radiance of each color light and the SSL drive current is required. This relationship depends on the characteristics of the SSL source as well as the color wheel. The approach also assumes that the chromaticity coordinates of the color lights do not change with drive current. If these conditions are not met, a hybrid approach can be used. First, measurements and calculations described in the second approach (steps S1301 to S1304) are carried out under the assumptions of a linear relationship between the radiance and drive current and constant chromaticity coordinates as a function of drive current. Then, the calculated drive current is used as an estimate and supplied to the SSL source, and the steps of the first approach (steps S1201 to S1205) are carried out to fine tune the drive current until a satisfactory white color is obtained.

Many other variations are possible. For example, while the chromaticity coordinates of the projected white color light can be directly measured (steps S1201 and S1202), they can also be calculated from measured chromaticity coordinates and radiance of the multiple color lights. Such calculated white chromaticity coordinates can be used in the comparison step S1203. Similarly, when the rotating color wheel generates three primary colors and no other colors, the chromaticity coordinates of each primary color light can be calculated from the measured chromaticity coordinates of the projected white light and the measured radiance of each projected primary color light. Such calculated chromaticity coordinates of the primary color lights can be used in the calculation step S1303.

The luminance of the light outputted by the rotating color wheel can be adjusted by changing the overall drive currents, while maintaining the white balance, i.e., maintaining the luminous flux ratio of the multiple colors.

In the above embodiments, modulation for three primary color lights is described. Of course, the method and system can be applied to modulation for two color lights or more than three color lights.

In the above described embodiment, the SSL source 601 generates a white light and the rotating wheel 604/204 has multiple filter segments to filter the white light into multiple color lights, such as red, green and blue. In an alternative embodiment, the SSL source 601 is a UV, near UV or blue light source, and the rotating color wheel 604/204 has multiple segments of different wavelength conversion materials such as phosphors, which absorb the light from the SSL source 601 (referred to as an excitation light) and convert it to various color lights such as red, green and blue lights. In other words, the R, G and B segments of the color wheel shown in FIG. 4 are red, green and blue phosphors instead of red, green and blue filters. The principle of white balance adjustment is the same in the systems that use wavelength conversion materials. Namely, the drive current supplied to the SSL source 601 is modulated in synchrony with the rotation of the color wheel 604, so that appropriate levels of drive current is supplied to the SSL source for each time periods when the red, green and blue phosphors are illuminated by the excitation light. In a variation of this embodiment, the excitation light from the SSL source 601 is a blue light, and the blue segment of the color wheel is a clear segment with no filter and no wavelength conversion materials, so that it transmits the blue light.

Although the above-described embodiments are applied to a projection system having one lighting source, the present invention is not limited to such a projection system. In alternative embodiments of the present invention, the lighting source may includes multiple SSLs (LDs or LEDs) that can be driven by different modulated drive current as controlled by a controller to produce the desired white balance or luminance. For example, a light source device according to an embodiment of the present invention, shown in FIG. 10, includes a yellow light source 111/112 and a blue light source 116. The yellow light is generated by a yellow phosphor wheel 112 excited by a UV or blue light source 111. Alternatively, the yellow phosphor may be carried on a stationary member, or coated on an UV or blue LED. The blue light source 116 may be blue LDs or LEDs. The yellow light (after the collection optics 113) and blue light are combined by a dichroic filter 114 to become a white light, which is directed by a lens 115 to the rotating color wheel 118. The color wheel 118 may carry R, G, B filters similar to the color wheel 204 in FIG. 4. The output of the color wheel 118 is collected by projection optics/DLP 117. In this embodiment, the controller 119 provides different drive currents for the light sources 111 and 116 respectively to achieve the desired white balance.

In one implementation, the drive current provided to each of light sources 111 and 116 is constant, but their relative values are determined by the desired white balance. In another implementation, the drive current provided to one or both of the light sources 111 and 116 may be additionally modulated corresponding to different color segments of the color wheel 118. In another implementation, the blue light source 116 can be turned off when the red and green filters of the color wheel 118 are under illumination, because the blue source 116 does not contribute to the red and green color output. Similarly, the excitation source 111 for the yellow light can be turned off when the blue filter is under illumination, as the yellow light does not contribute to the blue color output. As a result, energy can be saved by modulating (including partially turning off) the two driving currents. When such a modulation scheme is used, the blue filter of the color wheel 118 may be replaced by a clear segment without any filter.

Other aspects of this embodiment, such as the sync signal generation and utilization, are similar to those of the embodiment of FIG. 6.

Figure 10:
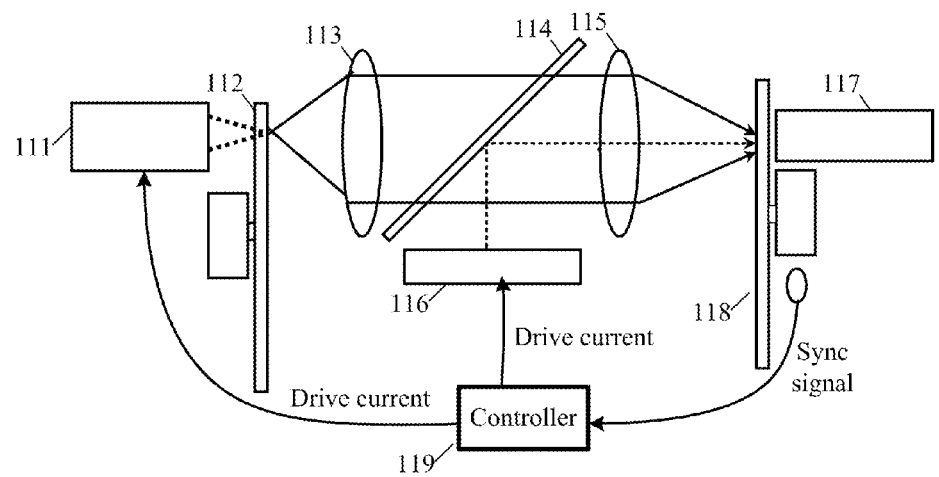
FIG. 10 is a schematic view showing an SSL source employing two different light sources according to another embodiment of the present invention.
Figure 11:
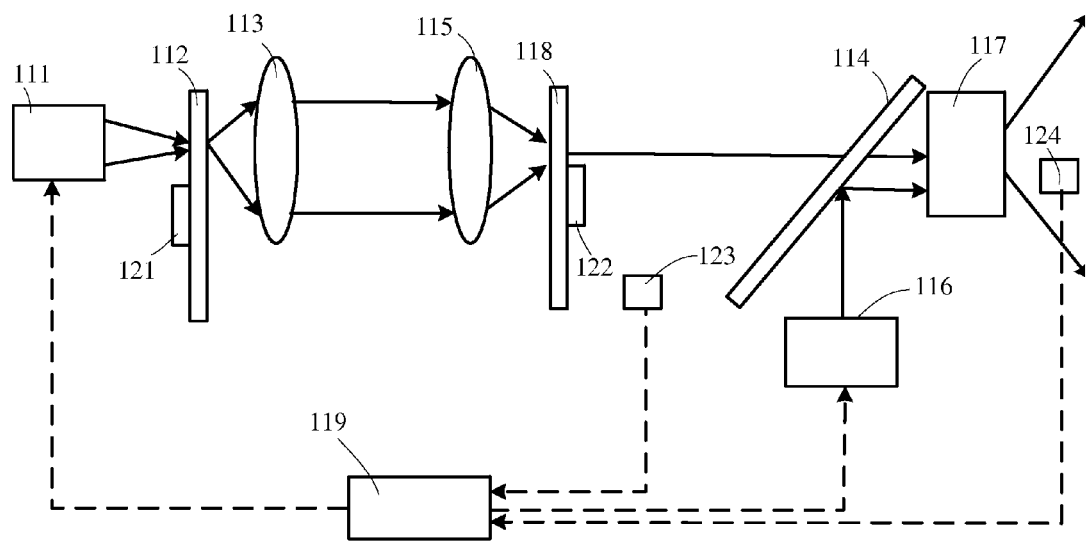
FIG. 11 is a schematic view showing an alternative SSL source employing two different light sources according to another embodiment of the present invention.

A light source device according to another alternative embodiment is shown in FIG. 11. This light source is similar to the one shown in FIG. 10 but the location of the dichroic filter (light combiner) 114 is changed to be downstream from the color wheel 114. Thus, the color light generated by the color wheel 118 is combined with the light of the second source 116 by the light combiner 114. The device also includes drive mechanisms 121, 122 for the wheels 112, 118, sync signal generator 123 and detector 125 (these components are present in FIG. 10 but are not labeled).

In the embodiment of FIG. 11, the rotating color wheel 118 is similar to that shown in FIG. 4, and includes three segments. The controller controls the first and second light sources 111 and 116 in synchronized manner with the rotation of the color wheel 118. When the first or second (e.g. R or G) segment of the color wheel is rotated into the path of the excitation light, the controller supplies a respective first or second drive current to the first light source 111 and turns off the second light source 116. When the third segment of the color wheel is rotated into the path of the excitation light, the controller supplies a third drive current to the second light source 116, and its light (blue) is reflected by the light combiner 114 and projected onto the screen by the optics 117. During this period, the drive current to the first light source 111 is not important if the third segment of the color wheel blocks the color light from the phosphor wheel 112 (i.e. it is a blue-pass filter or a non-transparent segment); alternatively, the first light source 111 can be turned off during this period.

In the embodiments of FIGS. 10 and 11, to "turn off" a light source means to supply a sufficiently low drive current such that the light source generates no light or a sufficiently low light level that, when projected on the screen, does not visibly affect the projected image.

In the embodiments of FIGS. 10 and 11, the intensities of the lights generated by the first and second light sources 111 and 116 can be separately adjusted, providing more flexibility to the system. They can also save energy and reduce heat generation by the light sources because they can be periodically turned off.

In similar manners, a white light source that includes three or more different color SSL sources or types of SSL sources (e.g., LE, LD) can be provided.

Figure 14:
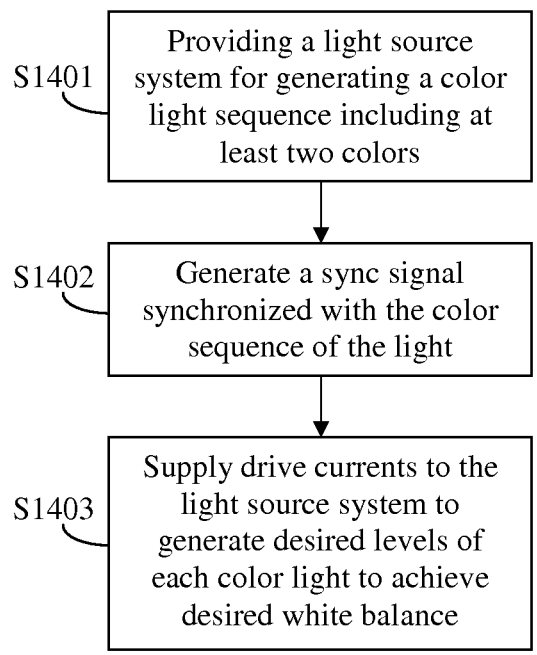
FIG. 14 shows a method according to an embodiment of the present invention.

To summarize, a white balance adjustment method according to embodiments of the present invention include the following steps as illustrated in FIG. 14. In step S1401, a light source system is provided, which may include one or multiple light source devices, for generating a color light sequence including at least two colors. In step S1402, a sync signal generator generates a sync signal synchronized with the color sequence of the light. In step S1403, a controller supplies modulated drive currents to the light source system, synchronized with the sync signal, to generate appropriate levels of each color light, so that desired white balance of the color light sequence is achieved. The drive currents supplied in step S1403 are determined by data stored in the controller, which has been previously determined based on measurements and calculations described earlier.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A projection system comprising:
a light source device for generating an output light which is a repeating color sequence of at least two primary color lights, the light source device including:
a first solid state light source for generating an excitation light;
a wavelength conversion device for converting the excitation light to a converted light;
a color wheel including at least a first and a second segment each carrying a filter; and a first drive mechanism for driving the color wheel to rotate, wherein the first and second segments are sequentially disposed on a path of the converted light as the color wheel rotates, wherein the first and second segments filter the converted light to generate first and second ones of the at least two primary color lights, respectively;

a synchronization signal generator for generating a synchronization signal representing a timing of the color sequence of the output light;

projecting optics for projecting the output light onto a screen;

a detector for measuring color properties of the output light; and a controller for calculating drive current values corresponding to each of the at least two primary colors based on a target white balance and the measured color properties of the output light, and supplying a modulated drive current to the light source device, the modulated drive current being synchronized to the synchronization signal and having the calculated drive current values, wherein the output light of the light source has the target white balance.

2. The projection system of claim 1, further comprising wherein the controller obtains chromaticity coordinates of each of the at least two primary color lights of the output light based on the optical properties measured by the detector, calculates target relative radiance values of the at least two primary color lights based on the chromaticity coordinates of the at least two primary color lights and target chromaticity coordinates of the target white balance, and calculates the drive current values based on the target relative radiance.

3. The projection system of claim 2, wherein the projection optics sequentially projects each of the at least two primary color lights onto the screen and the detector measures chromaticity coordinates of each of the at least two primary color lights.

4. The projection system of claim 2, wherein the projection optics sequentially projects each of the at least two primary color lights onto the screen and projects the output light as a white light on the screen,
wherein the detector measures chromaticity coordinates of the white light and radiance of each of the at least two primary color light, and
wherein the controller calculates chromaticity coordinates of the at least two primary color lights based on the measured chromaticity coordinates of the white light and the measured radiance of each of the at least two primary color light.

5. The projection system of claim 1, wherein the projection optics projects the output light as a white light on the screen,
wherein the detector measures chromaticity coordinates of the projected white light,
wherein the controller calculates the drive current values based on the measured chromaticity coordinates and target chromaticity coordinates of the target white balance using an iterative method.

6. The projection system of claim 1, wherein the synchronization signal generator detects a rotation position of the color wheel to generate the synchronization signal.

7. The projection system of claim 1, wherein the controller supplies a first drive current to the first solid state light source when the first filter segment is disposed on the path of the converted light, and supplies a second drive current to the first solid state light source when the second filter segment is disposed on the path of the converted light.

8. The projection system of claim 7, wherein the light source device further includes:
a second solid state light source for generating a third primary color light; and
a light combining device for combining the third primary color light with the converted light from the wavelength conversion device and directing the combined light to the color wheel;
wherein the color wheel further includes a third segment, wherein the first, second and third segments are sequentially disposed on a path of the combined light as the color wheel rotates, wherein the third segment transmits the third primary color light, and
wherein the controller supplies a third drive current to the second solid state light source when the third segment is disposed on the path of the combined light.

9. The projection system of claim 8, wherein the controller turns off the second solid state light source when the first and second segments are disposed on the path of the combined light, and turns off the first solid state light source when the third segment is disposed on the path of the combined light.

10. The projection system of claim 7, wherein the light source device further includes:
a second solid state light source for generating a third primary color light; and
a light combining device for combining the third primary color light with the light outputted from the color wheel;
wherein the color wheel further includes a third segment, wherein the first, second and third segments are sequentially disposed on a path of the converted light as the color wheel rotates, and
wherein the controller turns off the first solid state light source and supplies a third drive current to the second solid state light source when the third segment is disposed on the path of the converted light, and turns off the second solid state light source when the first or second segment is disposed on the path of the converted light.

11. The projection system of claim 1, wherein the wavelength conversion device includes:
a second wheel carrying a wavelength conversion material; and
a second drive mechanism for driving the second wheel to rotate, wherein the excitation light illuminates the wavelength conversion material along a predetermined path.

12. A color adjustment method for a projection system, comprising:
generating an output light by a light source device, the output light being a repeating color sequence of at least two primary color lights, including
generating an excitation light using a first solid state light source;
converting the excitation light into a converted light using a wavelength conversion device; and
driving a color wheel to rotate, the color wheel including at least a first and a second segment each carrying a filter, wherein the first and second segments are sequentially disposed on a path of the converted light as the color wheel rotates, wherein the first and second segments filter the converted light to generate first and second ones of the at least two primary color lights, respectively;

generating a synchronization signal representing a timing of the color sequence of the output light;
projecting the output light onto a screen;
measuring optical properties of the output light;
calculating drive current values corresponding to each of the at least two primary colors based on a target white balance and the measured optical properties; and
supplying a modulated drive current to the light source device, the modulated drive current being synchronized to the synchronization signal and having the calculated drive current values, wherein the output light of the light source has the target white balance.

13. The method of claim 12, wherein the calculating step includes:
obtaining chromaticity coordinates of each of the at least two primary color lights of the output light based on the measurement by the detector;
calculating target relative radiance values of the at least two primary color lights based on the chromaticity coordinates of the at least two primary color lights and target chromaticity coordinates of the target white balance; and
calculating the drive current values based on the target relative radiance.

14. The method of claim 13, wherein the projecting step includes sequentially projecting each of the at least two primary color lights onto the screen; and
wherein the measuring step includes measuring chromaticity coordinates of each of the at least two primary color lights.

15. The method of claim 13, wherein the projecting step includes sequentially projecting each of the at least two primary color lights onto the screen and projecting the output light as a white light on the screen;
wherein the measuring step includes measuring chromaticity coordinates of the white light and measuring radiance of each of the at least two primary color light; and
wherein calculating step includes calculating chromaticity coordinates of the at least two primary color lights based on the measured chromaticity coordinates of the white light and the measured radiance of each of the at least two primary color light.

16. The method of claim 12, wherein the projecting step includes projecting the output light as a white light on the screen;
wherein the measuring step includes measuring chromaticity coordinates of the projected white light; and
wherein calculating step includes calculating the drive current values based on the measured chromaticity coordinates and target chromaticity coordinates of the target white balance using an iterative method.

17. The method of claim 12, wherein the converting step includes:
driving a second wheel to rotate, the second wheel carrying a wavelength conversion material, wherein the excitation light illuminates the wavelength conversion material along a predetermined path.

18. The method of claim 12, wherein the step of generating an output light includes:
generating a first light using a first solid state light source; and
driving a color wheel to rotate, the color wheel including at least a first and a second segment, wherein the first and second segments are sequentially disposed on a path of the first light as the color wheel rotates, wherein the first and second segments either carry first and second filters which filter the first light to generate first and second ones of the at least two primary color lights, respectively, or carry first and second wavelength conversion materials which absorb the first light and convert it to first and second ones of the at least two primary color lights, respectively.

19. A light source device comprising:
a first solid state light source for generating an excitation light;
a first wheel carrying a wavelength conversion material;
a first drive mechanism for driving the first wheel to rotate, wherein the excitation light illuminates the wavelength conversion material along a predetermined path as the first wheel rotates, wherein the wavelength conversion material converts the excitation light into a converted light;
a second wheel having a first segment and a second segment; and
a second drive mechanism for driving the second wheel to rotate, wherein the first and second segments are sequentially disposed on a path of the converted light as the second wheel rotates, wherein the first and second segments include filters that filter the converted light to generate a first and a second primary color lights, respectively.

20. The light source device of claim 19, further comprising:
a second solid state light source for generating a third primary color light; and
a light combining device for combining the third primary color light with the converted light from the wavelength conversion device and directing the combined light to the second wheel;
wherein the second wheel further includes a third segment, wherein the first, second and third segments are sequentially disposed on the path of the combined light as the color wheel rotates, and wherein the third segment transmits the third primary color light.

21. The light source device of claim 19, further comprising:
a second solid state light source for generating a third primary color light; and
a light combining device for combining the third primary color light with the first and second primary color light from the second wheel;
wherein the second wheel further includes a third segment, wherein the first, second and third segments are sequentially disposed on the path of the converted light as the second wheel rotates, and
wherein the first solid state light source is turned off when the third segment is disposed on the path of the converted light, and the second solid state light source is turned off when the first or second segment is disposed on the path of the converted light.

* * * * *